United States Patent [19]

Sharpton

[11] 4,327,849
[45] May 4, 1982

[54] AUXILIARY GASOLINE CAN HOLDER FOR JEEP VEHICLES

[76] Inventor: Norman L. Sharpton, 103 S. Chickasaw, Dewey, Okla. 74029

[21] Appl. No.: 174,246

[22] Filed: Jul. 31, 1980

[51] Int. Cl.³ .............................................. B60R 9/06
[52] U.S. Cl. ........................... 224/42.03 A; 224/42.13; 224/42.43
[58] Field of Search ................. 224/42.03 R, 42.03 A, 224/42.03 B, 42.06, 42.07, 42.08, 42.13, 42.14, 42.38, 42.43, 42.44, 42.45 R

[56] References Cited

U.S. PATENT DOCUMENTS

| | | | |
|---|---|---|---|
| 1,575,074 | 3/1926 | Nordgren | 224/42.07 |
| 1,811,489 | 6/1931 | Blakely | 224/42.43 |
| 2,556,101 | 6/1951 | Negin et al. | 224/42.13 |
| 2,618,509 | 11/1952 | Carlson | 224/42.43 |
| 3,188,034 | 6/1965 | Jackson | 224/42.45 R |
| 3,658,201 | 4/1972 | Williams et al. | 224/42.13 |
| 4,132,336 | 1/1979 | Leinaar | 224/42.13 |
| 4,189,074 | 2/1980 | Davies | 224/42.06 |

*Primary Examiner*—Stephen Marcus
*Attorney, Agent, or Firm*—Head & Johnson

[57] ABSTRACT

Apparatus for use on the rear end of a vehicle for supporting two auxiliary gas cans, including a cross-arm affixed to the spare tire holder, a pair of short support arms each being affixed at the inner end to the opposed ends of the horizontal cross arm, a vertical can holder back affixed at the outer end of each support arm, a pair of bumper brackets each affixed at its lower end to the vehicle bumper and at the upper end to a vertical can holder back, a pair of support legs each affixed at its upper end to the lower end of a can holder back and the lower ends being affixed to the vehicle bumper, brackets on each can holder back for supporting the lower edge of a gasoline can and removable attachment elements secured to the upper end of the gasoline cans.

2 Claims, 5 Drawing Figures

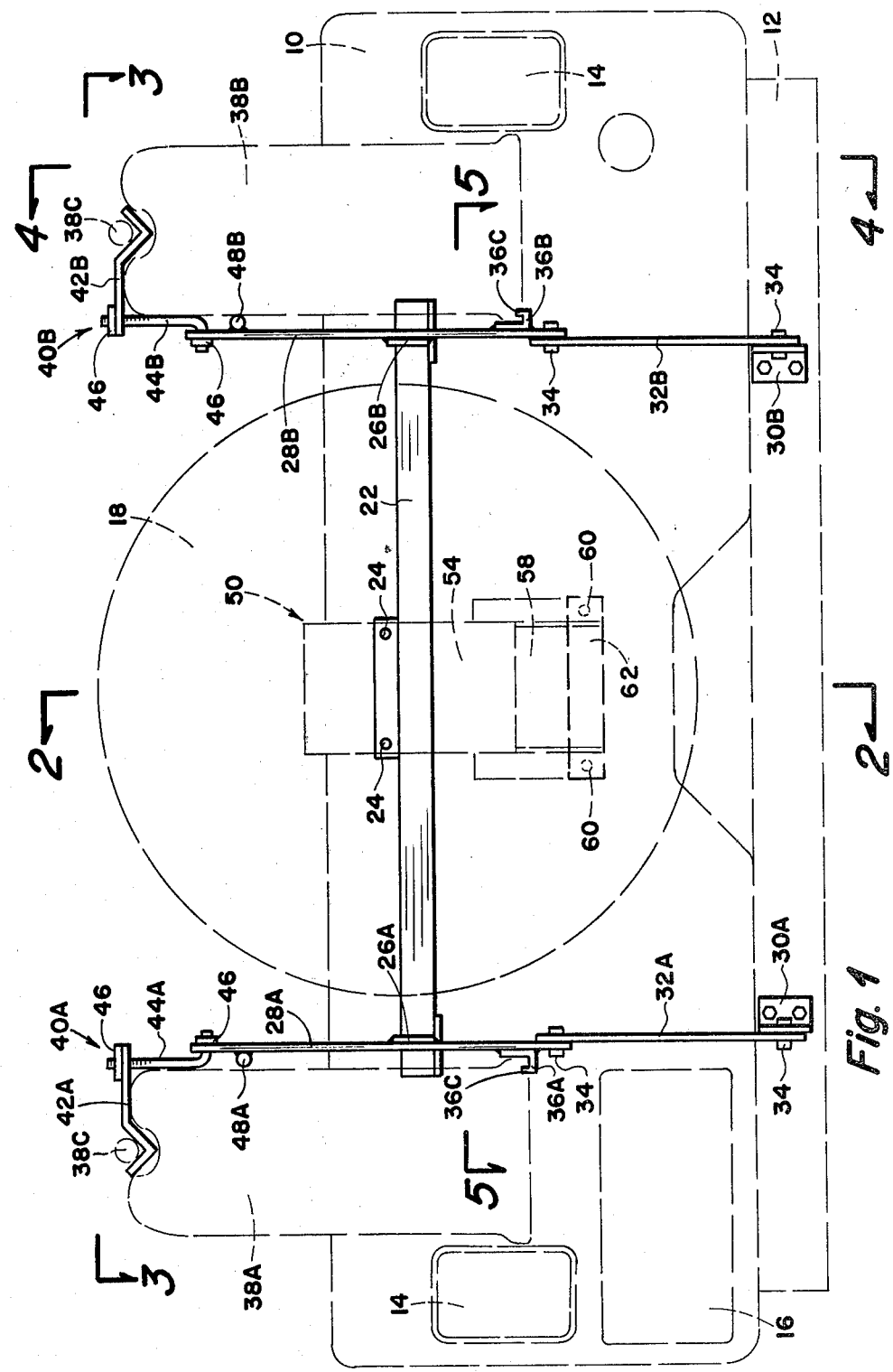

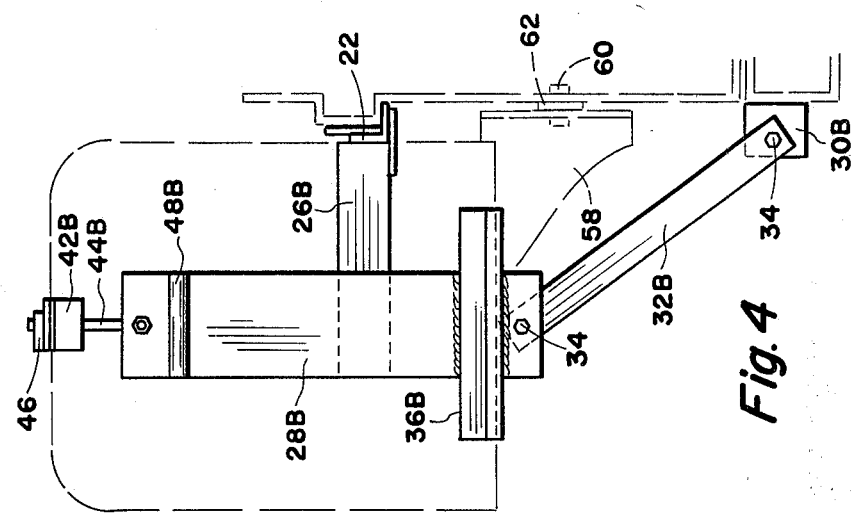
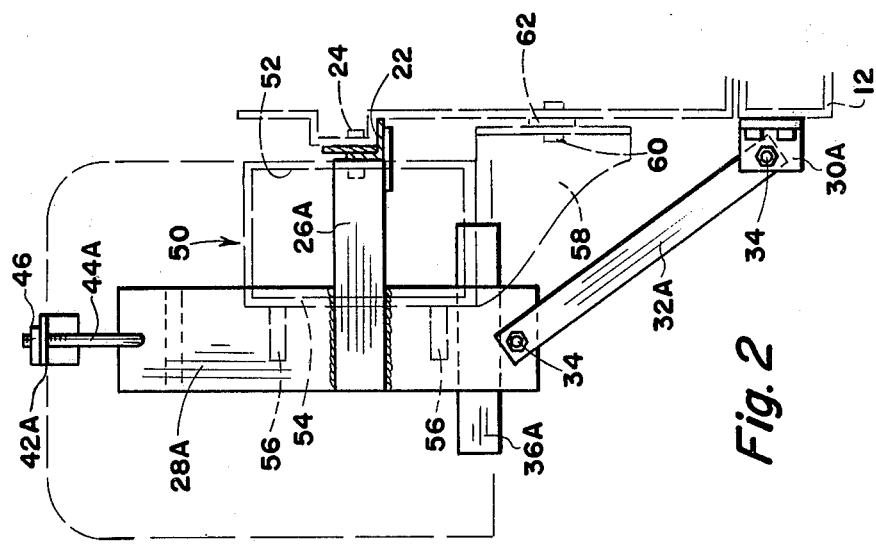

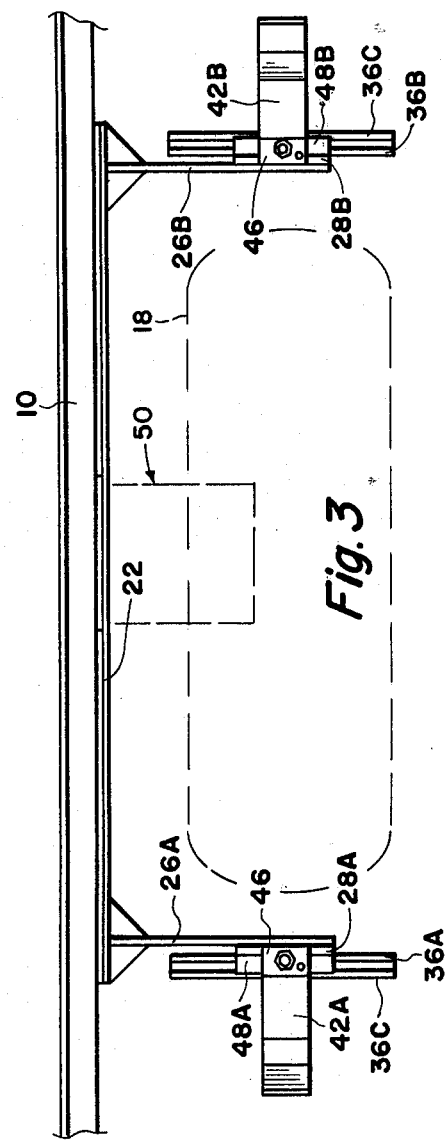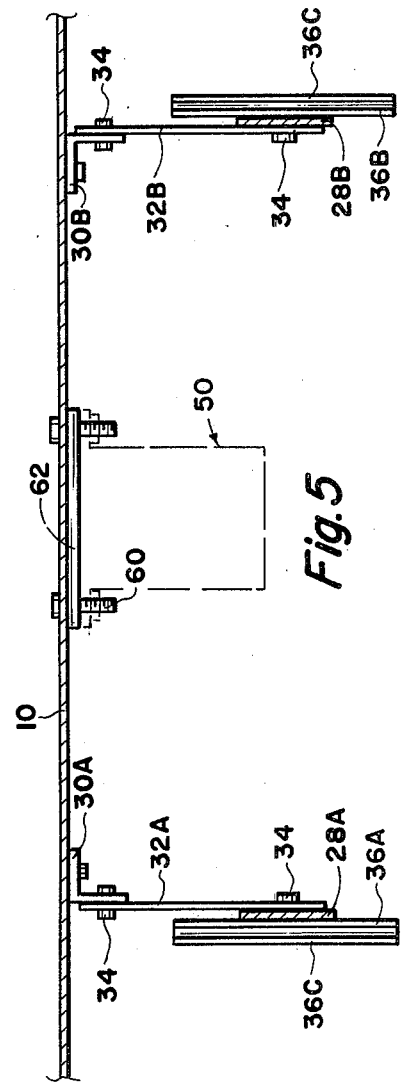

AUXILIARY GASOLINE CAN HOLDER FOR JEEP VEHICLES

BACKGROUND OF THE INVENTION

1. Field of the Invention

This invention relates to an apparatus for holding auxiliary gasoline cans on the rear of a vehicle. Particularly, the invention is an apparatus for supporting auxiliary cans to a "Jeep" type vehicle which typically has a rear bumper and, centrally positioned above the rear bumper, a spare tire holder.

2. Description of the Prior Art

Others have provided various devices for supporting auxiliary cans to the rear of a vehicle. As an example, U.S. Pat. No. 4,132,336 shows the method of mounting a gasoline can suspended about a band attached around the perimeter of the vehicle spare tire. The problem with this device is that it adds substantial weight to the vehicle spare tire support bracket. U.S. Pat. No. 3,188,034 shows a strap which engages the bottom lip of a gas can and includes means for locking the top. The strap is adapted to be attached to the sidewalls of a vehicle frame but does not provide means for removably supporting a pair of gasoline cans to the rear of a vehicle in such a way that the spare tire is accessible without removing the gas cans.

U.S. Pat. No. 3,658,201 shows a device which includes a framework which is pivoted to the frame of a vehicle. The purpose of the device of this patent is similar to the present invention; however, this prior art device has problems and limitations which has resulted in it not being commonly employed by vehicle users.

The present invention overcomes the problems and limitations of the prior art by providing an inexpensive and readily adaptable apparatus for attachment to the rear end of a vehicle which supports two auxiliary gas cans. The device provides a means wherein the spare tire of the vehicle may be mounted in its usual position and may be easily removed without disturbing the device supporting the auxiliary cans. Further, the device provides an arrangement which does not place undue strain on the spare tire holder and in which the spare gasoline cans are supported in such a way that they do not obscure the tail lights of the vehicle or the vision of the driver and are thereby supported in a manner superior to other known devices available in the prior art.

SUMMARY OF THE INVENTION

An apparatus is provided for use on the rear end of a "Jeep" type vehicle which has a rear bumper extending across the rear end of the vehicle. Above the bumper is a spare tire holder. The apparatus is used for supporting a pair of auxiliary gasoline cans and includes an elongated horizontal cross arm with bolt openings for attachment to the vehicle spare tire holder. A pair of short support arms are employed, each of the support arms being affixed at its inner end to opposed ends of the horizontal cross arm. Thus, the support arms extend horizontally and perpendicular to the cross arm and rearwardly of the vehicle. A vertical can holder backplate is affixed to the outer end of each of the support arms. The can holders are thereby supported parallel to and spaced apart from each other. A pair of bumper brackets are affixed to the vehicle rear bumper at points below the vertical can holders. A support leg extends from each of the bumper brackets to the lower end of each of the can holder backplates. The support legs thereby are inclined in a common plane upwardly and rearwardly from the bumper brackets to thereby securely support the can holder backs. Brackets are affixed to each of the can holder backs to receive the edge on the bottom of a gasoline can so that the cans are supported uprightly and contiguous to each of the can holder backs. A horizontally extending can retainer is movably attached to the upper end of each of the can backs. The can retainers extend over the tops of the cans to hold them in position on the can holder backs. By loosening the can holder retainers the gasoline cans may be individually removed as necessary. The cans are thus supported in a manner which does not interfere with the attachment or removal of the vehicle spare tire and are in an elevated position above the vehicle tail lights.

BRIEF DESCRIPTION OF THE DRAWINGS

FIG. 1 is an elevational view of the rear portion of a "Jeep" type vehicle shown in dotted outline and showing, in solid line, the apparatus of this invention affixed to the vehicle for supporting a pair of gas cans.

FIG. 2 is a vertical cross-sectional view taken along the line 2—2 of FIG. 1.

FIG. 3 is a plan view of the apparatus as affixed to the rear of a vehicle as taken along the line 3—3 of FIG. 1.

FIG. 4 is a vertical cross-sectional view taken along the line 4—4 of FIG. 1.

FIG. 5 is a horizontal cross-sectional view taken along the line 5—5 of FIG. 1.

DETAILED DESCRIPTION

Referring to the drawings and first to FIGS. 1, 2 and 3, a preferred embodiment of the invention is illustrated. Shown in dotted outline is the rear end 10 of a vehicle and, more specifically, a "Jeep" type vehicle which is typically used for driving in remote areas where roads are unimproved and where it is important to have auxiliary gasoline available. The vehicle includes, in dotted outline, a bumper 12 and includes tail lights 14 and a license plate 16. The vehicle includes means to support a spare tire 18. The elements described up to this time are part of the usual vehicle, and the object of this invention is to provide an apparatus for supporting auxiliary cans on the vehicle rear end.

For this purpose, an elongated horizontal cross arm 22 is secured in the middle portion thereof to the spare tire holder such as by means of bolts 24. Affixed adjacent the outer ends of the cross arm are short support arms 26A and 26B. The support arms extending perpendicular to the cross arm 22 are horizontal and parallel to each other and extend rearwardly of the vehicle rear end 10.

Affixed at the outer end of support arm 26A is a vertical can holder back 28A and in like manner, affixed to the outer end of support arm 26B is can holder back 28B. Each of the can holder backs are vertical and parallel to each other. The support arms 26A and 26B are preferably attached to the can holder backs 28A and 28B at a point intermediate the can holder back's upper and lower ends and to the inside surfaces thereof.

Attached to the vehicle bumper 12 are a pair of bumper brackets 30A and 30B. These are positioned below the support arms 26A and 26B. Extending from bumper bracket 30A to the lower end of can holder back 28A is a support leg 32A. In like manner, support leg 32B extends from bumper bracket 30B to can support back 28B. The support legs 32A and 32B are held at each end by bolts 34. The support legs 32A and 32B are thus, as shown in FIG. 2, inclined upwardly and rearwardly from the vehicle bumper in a common plane.

Affixed to the can holder back 28A at the outside lower edge thereof, is a horizontal can support member 36A. In like manner, affixed to the lower outer surface of can support back 28B is a can support member 36B. Each of the can support members 36A and 36B includes an integral upwardly extending horizontal ledge 36C. Shown positioned on the auxiliary gas can holder are a pair of gasoline cans 38A and 38B shown in dotted outline. These cans are of the rectangular cross-sectional type commonly employed by the military and are customarily used with recreational and service vehicles.

Cans 38A and 38B typically have a lower extending circumferential lip around the bottom edge and this lip is received by the can support member's horizontal edges 36C.

To removably retain the cans 38A and 38B in position on the can support members 36A and 36B, horizontal can retainers generally indicated by the numerals 40A and 40B are employed. While the horizontal can retainers 40A and 40B may take a variety of configurations, the illustrated arrangement is particularly useful for retaining cans having a handle member 38C which extends horizontal across the top of the can. The can retainers 40A and 40B each include a horizontal member 42A and 42B, each of which has a V-shaped integral portion at its outer end which fits under the can handle 38C. The inner end of the retainer horizontal portions 42A and 42B each has an opening which receives the upper end of J-bolts 44A and 44B. The lower end of J-bolt 48A is received in an opening in the upper end of can holder back 28A. Nuts 46 retain the J-bolt member in position. It can be seen that when the upper nut 46 is tightened it serves to retain can 38B in position on the can holder. In like manner, the can 38B is held in position by horizontal member 42B and J-bolt 44B. To make sure the cans are retained uprightly, spacers 48A and 48B are affixed to the upper interior surface of can holder backs 28A and 28B.

It can be seen that the can support described fulfills the objectives of the invention and provides means for holding auxiliary gas cans 38A and 38B in the manner which does not interfere with spare tire 18. Further, the tail lights 14 and license plate 16 are unobscured.

An advantage of the holder of this invention is that the entire assembly may be removed from the vehicle by removing nuts from bolts 24 which retain the cross arm to the spare tire holder 20 and by removing the lower bolts 34 from support legs 32A and 32B. The holes to which brackets 30A and 30B are fastened are pre-drilled. The entire can holder is arranged in such a manner as to avoid the drilling of any holes in the rear of vehicles of 1976 vintage to the present day.

The cross-sectional views of FIGS. 2-5 show more details of the auxiliary gas can holder. It can be constructed of readily available structural components without requiring any cast, molded or machined elements. It is therefore economical of construction, durable, and easily serviceable.

To facilitate mounting a spare tire on the rear of the vehicle after the auxiliary gas can holder has been installed, as described, a spare tire holder generally indicated by the numeral 50 may be employed. It includes a rectangular box open at each end, the inner surface 52 of which has openings adaptable to receive bolts 24 so that the same bolts which hold the cross arm 22 in position also holds the spare tire holder 50. The spare tire holder box outer plate 54 has bolts 56 for receiving the rim of the spare tire. To add rigidity to the spare tire holder, an angle bracket 58 is secured to the lower end of the box structure and is supported to the vehicle tail gate by bolts 60 extending through a spacer bar 62. The arrangement of the spare tire holder 50, while not a part of the gasoline can holder of this invention, adds serviceability to the gasoline can holder by rearwardly extending the spare tire between the auxiliary gas cans.

While the invention has been described with a certain degree of particularity, it is manifest that many changes may be made in the details of construction and the arrangement of components without departing from the spirit and scope of this diclosure. It is understood that the invention is not limited to the embodiments set forth herein for purposes of exemplification, but is to be limited only by the scope of the attached claim or claims, including the full range of equivalency to which each element thereof is entitled.

What is claimed:

1. For use on the rear end of a vehicle having a rear bumper extending thereacross and above the bumper a spare tire holder, an auxiliary gasoline can holder comprising:

an elongated horizontal cross arm having means for attachment to the vehicle spare tire holder by which the cross arm is secured to the vehicle;

a pair of short support arms each being affixed at the inner end thereof to the opposed ends of said horizontal cross arm, the support arms extending horizontally and perpendicular to said cross arm and rearwardly of the vehicle;

a vertical can holder back affixed at an intermediate point to the outer end of each support arm, the can holders being parallel to each other;

a pair of bumper brackets adaptable to be affixed to a vehicle rear bumper at points below said vertical can holders;

a pair of support legs, each being affixed at its upper end to the lower end of a said cam holder back and the lower end of each being affixed to a said bumper bracket, said support legs being thereby inclined in a common plane upwardly and rearwardly from said bumper brackets; and means on each said can back to secure a gasoline can thereto whereby the cans are held uprightly and spaced apart from each other and on opposite sides of the vehicle spare tire mount.

2. An auxiliary gas can holder according to claim 1 wherein said means on each said can back to secure a gasoline can includes:

a horizontal can support member affixed to the lower end of each can back, each support member having an integral upwardly extending horizontal ledge spaced from the can back to which it is attached, each can support member being adapted to receive the bottom of a gasoline can thereon and the horizontal ledge serving to retain the downwardly extending lip of a can bottom thereon; and a horizontally extending can retainer removably attached to the upper end of each can back, the can retainers removably extendable over and parallel to said can support members to engage the top of a gasoline can supported on said can support members; and means to adjustably position said can retainers vertically relative to said can support members.

* * * * *